Sept. 25, 1951 R. C. A. ELAND 2,568,797
MICROPHONIC SUPPRESSION SYSTEM FOR ELECTRIC PHONOGRAPHS
Filed March 19, 1949

INVENTOR.
ROBERT C. A. ELAND
BY
Brown, Denk & Synnestvedt
AGENTS

Patented Sept. 25, 1951 2,568,797

UNITED STATES PATENT OFFICE 2,568,797

MICROPHONIC SUPPRESSION SYSTEM FOR ELECTRIC PHONOGRAPHS

Robert C. A. Eland, Philadelphia, Pa., assignor to Philco Corporation, Philadelphia, Pa., a corporation of Pennsylvania Application March 19, 1949, Serial No. 82,410

3 Claims. (Cl. 179—100.4)

The present invention relates broadly to the suppression of undesired signals produced by electromechanical transducers and, more particularly, to the suppression of microphonics in sound reproducing devices which employ such transducers.

In general, such sound reproducing devices comprise not one, but two electromechanical transducers, one of them being adapted to sense mechanical variations in some intelligence transmissive medium and to transform these variations into corresponding electrical impulses or signals, while the other one may be arranged to respond to these electrical signals in such a manner as to produce corresponding mechanical variations in a different intelligence transmissive medium. These transducers must, of course, be electrically coupled, and, although this is not essential, the coupling means, in most practical cases, also introduces some amplification into the electrical signals which it transmits.

A practical device of this type may be found embodied in any conventional phonograph which includes, in general terms, an electromechanical pick-up which may comprise a stylus mechanically coupled to a crystal and so arranged that the stylus may follow the variations in the mechanical configuration of a groove in a record disc. In this case the disc constitutes the intelligence transmissive medium and the groove variations represent the intelligence. These movements of the stylus produce deformations of the associated crystal which latter, by the well-known piezoelectric effect, produces a voltage output which is related in a simple manner to the amplitude and frequency of the stylus movements. This voltage output is ordinarily applied to an electronic amplifier where its amplitude is increased to some desired level, the voltage output of the crystal being usually too low to actuate the remaining electromechanical transducer. This latter usually takes the form of a loudspeaker having some sort of diaphragm which vibrates in response to the electrical signals derived from the output of the amplifier thereby bringing the surrounding air into vibration and producing audible sounds. Considerable amounts of power are usually supplied to and dissipated by this loudspeaker with the result that the mechanical vibrations of its diaphragm are quite strong. Since in present day commercial phonographs the loudspeaker is ordinarily mounted upon and partly enclosed in some cabinet in order to improve its acoustical performance as well as its appearance, it is practically inevitable that some of these vibrations are transmitted to the surrounding cabinet. In addition, it is customary to incorporate the pick-up, the amplifier and the loudspeaker, as well as associated elements such as record turntable and the like in a single cabinet. This, in turn, will almost inevitably bring about a situation in which the vibrations imparted by the loudspeaker to the cabinet will eventually find their way back to the pick-up where they will be transformed into electrical signals by the crystal just as though they were due to stylus movements in response to intelligence conveyed by a record disc. These signals will be amplified and again applied to the loudspeaker where they now appear—considerably amplified—in the form of sounds which do not correspond to any recorded intelligence.

Undesired sounds which arise in this manner are commonly referred to in the art as "microphonics" and the term is therefore used in this sense in the following discussion.

The peril of such an effect to faithful sound reproduction assumes even more serious proportions when it is realized that several factors combine to enhance its severity. To begin with, the natural frequency range of vibration of most cabinetry of the type used to house phonograph equipment is quite low, being principally in the region between zero and fifty or sixty cycles per second. Thus vibrations in this range imparted to the cabinet and other structural members by the loudspeaker tend to produce resonance effects which may increase the amplitude of such vibrations far beyond that due to the loudspeaker alone. Another contributory factor resides in the fact that the frequency response characteristics of the electronic amplifiers used in present-day phonographs are not only far from flat but actually exhibit considerable rises in the low-frequency region. This is, in most cases, brought about intentionally to produce what is known in the art as bass enhancement. This latter procedure, as well as its justification and significance are sufficiently well known in the art to permit dispensing with a detailed analysis thereof at this point. A more thorough discussion of such of its features as are related to my inventive concept is, of course, to be found in the subsequent discussion.

It is, ordinarily, impractical to make such modifications in cabinet structure as might overcome its contribution to the production of microphonics since this structure is of necessity composed of relatively bulky physical components, which, due to their high inertia, tend to vibrate at very low frequencies. Consequently, most of the effort which has been expended in the past in trying to overcome the deleterious effect of microphonics on the performance of the type of sound reproducing apparatus here being discussed has been directed either toward isolating the various components of the mechanical system in such a way as to prevent speaker vibrations from being fed back to the electronic portions of the system or toward rendering the electronic portions, and in particular the amplifier, to the greatest permissible extent insensitive to electrical voltage variations which may be set up in response to these mechanical vibrations in the manner hereinbefore described.

The mechanical isolation has been carried out by rubber-mounting the speaker, spring-mounting the turntable and, in general, introducing elastic junctions between various components of the mechanical system. While these mechanical remedies were to some extent successful, they were also very expensive to apply, since they required the use of costly components such as rubber or spring suspensions. They also tended to make construction and maintenance more complicated and the overall size of the reproducing apparatus more bulky.

Most of these drawbacks, it was felt, could be eliminated if it were possible to obtain similar results by operating on the electronic portions of the apparatus, most electronic components being inherently simple, small in size and relatively inexpensive. The principal form which these latter efforts took consisted of inserting, in the amplifier, filters so adjusted as to suppress or at least greatly attenuate the low-frequency region. Unfortunately this method suffered from a fatal defect. If the filtering were made sufficiently strong to eliminate microphonics, or at least to reduce them to a satisfactorily low auditory level, then this treatment greatly restricted the frequency response characteristic of the reproducing apparatus. Although this deterioration was noticeable to some degree over the whole band, it was most pronounced in the region of intentional bass emphasis, thus eliminating any benefits derived from the latter. If, on the other hand, the filtering were kept sufficiently weak to retain the proper overall frequency respons, then it was, for all practical purposes, ineffective in reducing microphonics to a tolerable level.

Accordingly, it is a primary object of my invention to provide an improved circuit arrangement adapted to reduce microphonics in sound reproducing apparatus to a tolerable level.

It is another object of my invention to provide means for substantially eliminating microphonics in sound reproducing apparatus while leaving the frequency response of the apparatus substantially unaltered.

It is a further object of my invention to provide a novel negative feedback circuit associated jointly with an electromechanical transducer and with the amplifier of a sound reproducing apparatus and adapted to substantially decrease microphonics, while leaving the overall frequency response of such apparatus substantially unaltered over the audible range.

Still another object of my invention resides in providing such a feedback circuit composed of simple, rugged and inexpensive circuit elements, which may be conveniently installed in conventional sound reproducing apparatus.

These and other objects of my invention will become more clearly apparent from a consideration of the subsequent discussion when taken in conjunction with the accompanying drawings wherein.

Figure 1:
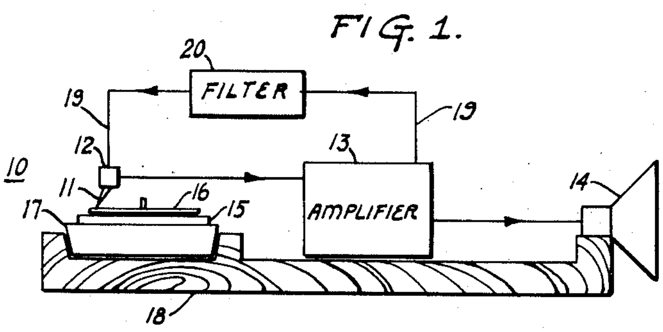
Figure 1 is a diagrammatic representation of sound reproducing apparatus comprising an embodiment of my invention.

Referring now in more detail to Figure 1, there are shown in diagrammatic form the major components of a conventional phonograph system together with my novel arrangement for suppressing microphonics. The conventional portions of the system comprise an electromechanical transducer 10, which consists principally of a stylus 11 and a crystal 12; an amplifier 13 coupled to the output of crystal 12, the coupling therebetween being indicated by the connecting line shown, and the direction of intelligence transmission by the direction of the arrowhead placed thereon; and a loudspeaker 14 in turn coupled to the output of amplifier 13. A turntable 15 is provided in suitable proximity to stylus 11 and arranged to support a record disc 16, the intelligence recorded on which is to be reproduced by the system. A suitable chassis 17, comprising the components conventionally employed to impart rotational movement to the turntable, is, of course, also provided. These components are all arranged within, and supported by a common cabinet structure here indicated schematically by the supporting member 18. This cabinet may be made of some suitable structural material such as wood. It is this common cabinet structure which is, in general, responsible for the occurrence of microphonics, in the manner hereinbefore outlined. It will be understood that the particular form or design of the various components heretofore described does not constitute in any way an essential feature of my invention. Practically any of the various types of such components known in the art may be employed in this case without vitiating the applicability of my inventive concept, to which latter the immediately subsequent discussion is now more particularly directed.

In accordance with the invention there is added, to the conventional components heretofore described, a feedback circuit which diverts a portion of the signals developed in amplifier 13 and applies this diverted portion, after suitable modification, back to the crystal in such a manner as to effect mechanical damping of the vibrations of stylus 11, the feedback signal effecting this damping by virtue of the inverse piezoelectric effect exhibited by the crystal. In the arrangement of Figure 1, the feedback path is shown to comprise conductor 19 and filter 20 which together couple an output circuit of amplifier 13 back to crystal 12, the direction of signal transmission in this circuit being again indicated by the arrowheads placed on conductor 19.

Before proceeding with a more detailed description of a specific embodiment, and in order to prevent any possibility of confusion between the feedback circuit constructed in accordance with my invention and prior art feedback circuits, which may bear some prima facie resemblance thereto, some general principles which govern the design and construction of circuits in accordance with my invention will be outlined. To begin with, the particular portion of the amplifier from which the feedback signal is derived is not of primary importance provided only that the signal at that point be of sufficient amplitude to provide a sufficiently strong feedback signal. While it is preferred that the point at which the feedback signal is derived supply a signal which is oppositely phase to that which appears at the crystal output, this is not essential, since conventional phase reversing means may be inserted in the feedback circuit proper. It is essential, however, that the signal which reaches the crystal via the feedback circuit be substantially in phase opposition to the signal developed by the crystal. The filter included in the feedback circuit may be a conventional low-pass filter so arranged as to pass, substantially without attenuation, signal components of frequencies up to fifty or sixty cycles per second, thus covering the frequency band in which microphonics ordinarily make themselves felt. As for the actual manner of applying the feedback signal to the crystal, the essential feature, in accordance with my invention, is that this signal be so applied as to subject the crystal element itself to the direct electrostatic effect of the signal voltage. This requirement implies, of course, that the feedback circuit must not be isolated from the electrical circuit of the crystal by the interposition of an amplifier stage, since, in general, an amplifier, particularly a low-frequency amplifier, is a unidirectional device in the sense that signals applied to its output will not affect its input to any noticeable degree. Instead, the signal must be fed back either to the crystal proper, in a manner described in more detail hereinafter, or at least to a point in its output circuit from which the signal voltage may be directly impressed upon the crystal electrodes.

Figure 2:
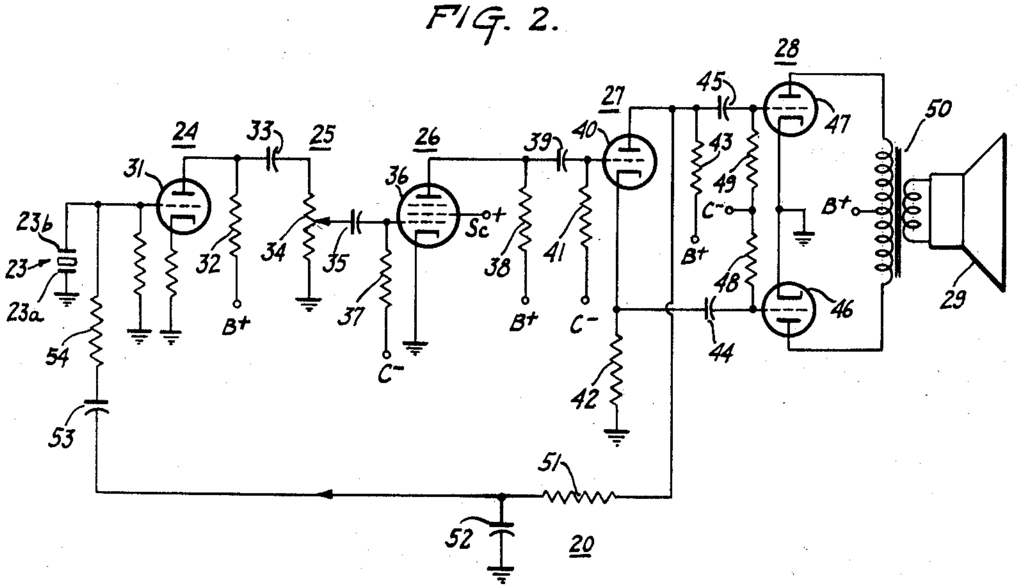
Figure 2 is a more detailed, schematic diagram of the electronic elements of the apparatus shown in Figure 1 and comprises a preferred embodiment of my invention.

A more detailed representation of a system embodying my inventive concept is found in Figure 2, to which specific reference is now made. There is illustrated, in conventional schematic form, a phonograph system comprising, in general terms, a crystal pickup 23, a first audio frequency amplifier 24, a volume control 25, a second amplifier 26, a third amplifier 27, a push-pull output stage 28, and a loudspeaker 29.

Crystal 23 is of any conventional type suitable for use in phonograph pickups. This crystal is mounted between a pair of electrodes respectively designated by reference numeral 23*a* and 23*b* across which the signal output of the crystal is developed under the influence of the mechanical deformation imparted to the crystal by a suitable stylus (not shown) and the consequent piezoelectric response of the crystal. This output signal is applied to the control grid of amplifier tube 31. A conventional plate load resistor 32 is provided for connecting the plate of tube 31 to an appropriate source of plate potential B+. A coupling condenser 33 connects the signal output of amplifier 24 to volume control resistor 34 and a D. C. blocking condenser 35 connects the variable tap on resistor 34 to the control grid of second amplifier tube 36. The control grid of amplifier 36 may be returned to a suitable source of grid bias potential C− by way of the resistor 37. Tube 36 may be a pentode having a grounded cathode, a screen grid connected to a suitable source of screen potential Sc+, and a plate connected to a suitable source of plate potential B+ via a plate load resistor 38. Another coupling condenser 39 couples the output of tube 36 to the grid of third amplifier tube 40 which may also be biased through a suitable bias resistor 41 returned to a source of bias potential C−. The third amplifier 27 may be arranged as a cathode phase-inverter stage comprising a cathode returned to ground via a resistor 42 and a plate returned to a suitable source of plate potential B+ via resistor 43. Resistors 42 and 43 are preferably of substantially equal magnitude. Output signals are derived simultaneously from the cathode and the anode of tube 40 and applied, via coupling condensers 44 and 45 respectively, to the corresponding control grids of push-pull output tubes 46 and 47. The grids of these tubes are returned, via resistors 48 and 49 respectively, to a common source of bias potential C−. The cathodes of tubes 46 and 47 are grounded and their plates connected, respectively, to opposite ends of the center tapped primary winding of an output transformer 50. The secondary winding of transformer 50 is then coupled to loudspeaker 29 to complete the conventional phonograph system. It will be understood, that certain refinements, such as tone controls and the like, which would be included in a practical system of the type described, have been omitted from this discussion in the interest of simplicity of description and to bring out the features of my invention without the introduction of confusing unrelated material.

In the incorporation of my novel feedback circuit into the phonograph system hereinbefore described, the point at which this feedback circuit originates is of considerable importance and should be chosen with care. In the particular system illustrated, several factors combine to make the plate of third amplifier tube 40 particularly suitable for purposes of deriving feedback signals therefrom.

Firstly, by the time signals originating at the crystal reach this plate, they have ordinally undergone sufficient amplifications to make their amplitude suitable for feedback.

Secondly, each stage of amplification of the type illustrated effects a phase reversal of the signal applied thereto. As has been pointed out hereinbefore the feedback signals should be substantially in phase opposition to the crystal output signals. This may be accomplished most readily by deriving the feedback signals from the plate load of an odd-numbered amplifier stage. Deriving the feedback signal from a point at which it is inherently out of phase with the crystal output eliminates the need for a separate phase inverter in the feedback circuit.

Thirdly, it is desirable, from a practical point of view, to derive the feedback signals from a point in the system which is so located that the gain or volume control may be inserted intermediate that point and the pickup device. With this arrangement any increase in gain—which would ordinarily increase the tendency of the system to produce microphonics—will, in my novel arrangement, also increase the amplitude of the signal which is fed back, thus increasing the crystal damping and compensatorily reducing the tendency toward microphonics.

Referring now once more to Figure 2, there is shown, coupled to the plate of tube 40, for the reasons hereinbefore set forth, a feedback circuit according to my invention comprising a low-pass filter network 20 which may consist of a series resistor 51 and a shunt condenser 52. The low-frequency signal components developed across condenser 52 are thence fed back to the output connection of crystal 23 via D.-C. blocking condenser 53 and resistor 54. The signal thus applied to the pickup creates, by virtue of the inverse piezoelectric effect exhibited by the crystal, a force on the stylus which is so phased as to oppose the force created thereon by the mechanical vibrations fed back via the cabinet structure from the loudspeaker, thereby damping such vibrations and suppressing microphonics. It is now clear that the feedback signal must be brought back to a point ahead of the amplifier stage nearest the crystal, since otherwise, the signal will not be able to produce the mechanical damping action described. It is understood, of course, that in a system of the type pictured in Figure 2, the feedback signal will also introduce negative feedback into the amplifier 24, but this action is secondary and insufficient, of itself, to suppress microphonics to the desired extent.

Typical values for the components of the feedback circuit shown, which have yielded satisfactory results in practice, may be taken as 220,000 ohms for filter resistor 51, 0.0063 microfarad for by-pass condenser 52, 0.5 microfarad for D.-C. blocking condenser 53 and 4.7 megohms for resistor 54. These exact values do not constitute an essential feature of the invention, but are merely indicative of a preferred set of conditions, the actual design of a feedback circuit constructed in accordance with my invention being predicated upon a knowledge of the frequency response characteristic of the particular phonograph system and of its relation to the range of frequencies which must be suppressed in order to prevent microphonics. The feedback circuit is then designed to permit the return to the crystal of output components in this latter range of frequencies.

Comparative tests have shown that my novel arrangement is considerably superior to the prior art filter arrangements hereinbefore described, in that the former in no way interferes with the gain of the system outside the range of microphonic frequencies, while, to be effective, the attenuation of the prior art filters had to extend far into the audio range with resultant distortion of the audible output.

Figure 3:
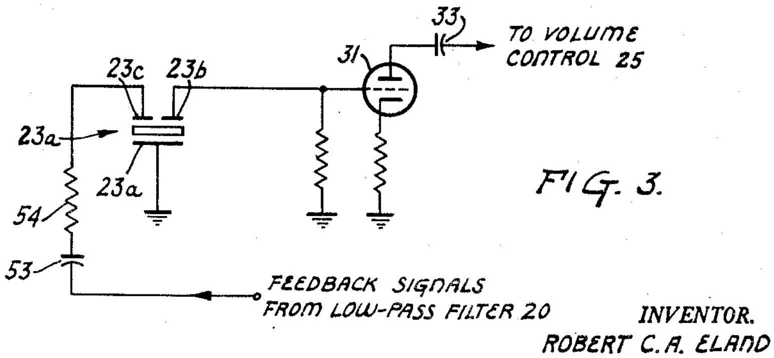
Figure 3 is illustrative of an alternative embodiment of my invention.

It may, under certain conditions, be desired to return the feedback signal to the crystal pickup element 23 without, at the same time, applying the entire feedback signal to the input circuit of the first audio amplifier. This may be done by modifying the crystal-pickup portion of the circuit of Figure 2 in the manner illustrated in Figure 3. In Figs. 2 and 3 corresponding elements are identified with like reference characters so that the circuit modification may be readily understood. As will be apparent from a comparison of the figures, the circuit change consists solely in returning the feedback signal voltage not to the output crystal electrode **23*b*, as was done in the circuit of Figure 2, but rather to an auxiliary feedback electrode 23*c* as illustrated in Figure 3. A split-plate type of crystal may be employed for crystal pickup 23** in order to make such an arrangement possible, one portion of the split plate supplying the output circuit and the other portion thereof applying the feedback signals to the crystal.

While the embodiments hereinbefore described serve to exemplify my inventive concept, it will be understood that they are capable of modifications by those skilled in the art. I, therefore, desire the scope of my inventive concept to be limited only by the appended claims.

I claim:

1. The combination comprising: a phonograph record player including a piezoelectric crystal pickup, an amplifier, a loudspeaker, common support means for all of the preceding elements, means connecting the output terminals of said pickup to the input terminals of said amplifier, means connecting the output terminals of said amplifier to the input terminals of said loudspeaker, means including said amplifier for developing a voltage which is substantially in phase opposition to the voltage developed by said crystal pickup, and means for applying said voltage to the output terminals of said pickup, the last-named means including a low-pass filter having a frequency response characteristic approximating the sound transmission characteristic of said common support means.

2. The combination comprising: a first electromechanical transducer, said transducer being operative to convert applied mechanical motion into an electrical voltage and, conversely, to convert an applied electrical voltage into mechanical motion, an amplifier for amplifying the voltages developed by said transducer, a second electromechanical transducer, means for applying to said last-named transducer amplified voltages derived from said amplifier, said last-named transducer being operative to convert said applied voltages into mechanical motion, means deleteriously transmitting mechanical motion of predetermined frequency from said last-named transducer to said first-named transducer, filtering means for deriving a voltage of said predetermined frequency only from said amplifier, and means for applying said voltage to said first-named transducer in phase opposition to the voltage developed by said transducer in response to said deleteriously transmitted motion.

3. The combination comprising: a phonograph record player including a piezoelectric crystal pickup whose crystal is provided with electrodes and arranged to develop output voltage between a common electrode and each of a pair of separate electrodes; an amplifier; a loudspeaker; common support means for all of the preceding elements; means connecting said common electrode and one of said separate electrodes to the input terminals of said amplifier; means connecting the output terminals of said amplifier to the input terminals of said loudspeaker; means including said amplifier for developing a voltage which is substantially in phase opposition to the voltage developed by said crystal; and means for applying a portion of said voltage between said common electrode and the other of said pair of separate electrodes, the last-named means including a low-pass filter having a frequency response characteristic approximating the sound transmission characteristic of said common support means.

ROBERT C. A. ELAND.

REFERENCES CITED

The following references are of record in the file of this patent:

UNITED STATES PATENTS

| Number | Name | Date |
|---|---|---|
| 1,902,184 | Rieber | Mar. 21, 1933 |
| 2,157,880 | Albersheim | May 9, 1939 |
| 2,351,079 | Strobel | June 13, 1944 |
| 2,367,110 | Fayers | Jan. 9, 1945 |
| 2,385,260 | Cox | Sept. 18, 1945 |

OTHER REFERENCES (Magazine) Radio-Craft, March 1941, page 522.